United States Patent [19]

Fibiger et al.

[11] Patent Number: 4,828,700

[45] Date of Patent: May 9, 1989

[54] REJECTION ENHANCING COATINGS FOR REVERSE OSMOSIS MEMBRANES

[75] Inventors: Richard F. Fibiger; Michael J. Colucci, Saginaw; David J. Forgach, Midland; Ritchie A. Wessling, Midland; Donald L. Schmidt, Midland, all of Mich.

[73] Assignee: The Dow Chemical Company, Midland, Mich.

[21] Appl. No.: 162,824

[22] Filed: Mar. 2, 1988

Related U.S. Application Data

[63] Continuation-in-part of Ser. No. 75,497, Jul. 20, 1987, abandoned.

[51] Int. Cl.$^4$ .............................................. B01D 13/00
[52] U.S. Cl. ............................ 210/500.32; 210/500.38
[58] Field of Search ..................... 210/500.27, 500.28, 210/500.29, 500.3, 500.31, 500.32, 500.37, 500.38

[56] References Cited

U.S. PATENT DOCUMENTS 4,704,324 11/1987 Davis et al. .................... 210/500.27

Primary Examiner—Frank Sever

[57] ABSTRACT

Reverse osmosis membranes treated with polymers bearing carboxylic acid groups and optionally pendant hydroxyl or amide moieties display enhanced salt rejection and/or increased water flux. This treatment is particularly useful for improving the membrane characteristics of cellulose acetate and polyamide membranes.

10 Claims, No Drawings

REJECTION ENHANCING COATINGS FOR REVERSE OSMOSIS MEMBRANES

CROSS-REFERENCE TO RELATED APPLICATION

This is a continuation-in-part of copending U.S. application Ser. No. 075,497, filed July 20, 1987, now abandoned.

BACKGROUND OF THE INVENTION

This invention pertains to treatments for reducing the salt passage through reverse osmosis membranes.

Removal of materials dissolved or dispersed in a liquid medium by separation of these materials from the dispersing medium or solvent utilizing reverse osmosis processes is well known. Reverse osmosis processes utilize membranes which are selectively permeable to certain components of the solution or mixture. A chemical potential is established across the membrane such that components to which the membrane is permeable will diffuse from a first surface through the membrane to a space in contact with the opposite side of the membrane. Conventionally, aqueous solutions of sodium chloride or other salts are treated by a reverse osmosis process to produce a water permeate of reduced salt content.

A wide variety of materials have been disclosed in the prior art to be useful as reverse osmosis membranes. Two of the more widely used reverse osmosis membrane materials are cellulose esters and polyamide membranes. U.S. Pat. Nos. 3,494,780 and 3,532,527 describe processes for making cellulose ester membranes useful in reverse osmosis processes. Cellulose acetate membranes have enjoyed considerable commercial success.

Polyamide membranes have also been employed commercially in reverse osmosis processes. U.S. Pat. No. 4,277,344 describes a variety of membranes having polyamide discriminating layers. Thin film composite membranes having crosslinked polyamide discriminating layers have proven particularly useful in reverse osmosis processes. Such membranes are further illustrated in U.S. Pat. Nos. 4,520,044 and 4,606,943. Other polyamide membranes of interest are described in U.S. Pat. Nos. 3,551,331 and 3,567,632.

A variety of other materials have been evaluated in the prior art as discriminating layers for reverse osmosis membranes. For example, sulfonated polysulfone, crosslinked furfuryl alcohol derivatives, crosslinked polyvinyl alcohol and crosslinked alkyl/aryl polyureas can be used as reverse osmosis membranes. Other reverse osmosis membranes are described in U.S. Pat. Nos. 3,744,642; 3,926,798; 4,005,012; 4,366,062 and 4,634,531.

Techniques for manufacturing reverse osmosis membranes frequently produce membranes having a plurality of defects or discontinuities in the discriminating layer. Conventionally, commercial reverse osmosis membranes have been treated to plug or seal these defects. U.S. Pat. No. 3,877,978 discloses the use of copolymers of vinyl acetate with various ethylenically unsaturated carboxylic acids to enhance the rejection of semi-permeable membranes. U.S. Pat. No. 3,886,066 describes the use of hydrolyzable tannins to reduce the salt passage through semi-permeable membranes. U.S. Pat. No. 4,214,020 describes a process for coating the exteriors of hollow fiber membranes to enhance their membrane characteristics. U.S. Pat. No. 4,634,531 describes the use of sequential treatment with a water-soluble amine and a water-soluble aldehyde to improve selective permeation. The prior art techniques can be used to significantly reduce salt passage through reverse osmosis membranes but generally result in a significant loss of water flux through the membrane.

A report available from NTIS designated PB81-170607, published Jan. 31, 1981, describes a variety of agents for regenerating reverse osmosis membranes. Polyacrylamide was evaluated, but in regeneration of a polyamide membrane commercially available from DuPont was found ineffective as noted on page 42. Polyacrylic acid and cationic, anionic and nonionic polyacrylamide did increase the rejection of deteriorated poly(ether/amide) membranes as apparent from Table 5-1 on page 42. Cationic polyacrylamide also increased salt rejection of new cellulose diacetate membranes, as apparent from page 53.

Another report available from NTIS designated PB82-157975, submitted in January 1981, discloses post-treatment processes for polyamide membranes. A variety of reagents including polyacrylamide (see page 8) were used with perforated composite polyamide membranes. These polyamide membranes had a desalinizing layer prepared by reaction of trimesoyl chloride and m-phenylenediamine. The polyacrylamide treatment did not restore the desired rejection of greater than 90 percent.

Japanese Kokai No. 55-011,048 describes vinyl polymers bearing ether, carboxylic acid and carboxylic acid ester groups which enhance rejection of cellulose acetate reverse osmosis membranes without lowering water flux.

The art has long sought techniques to reduce salt passage through a reverse osmosis membrane without a significant loss of water flux through the membrane. A technique for restoring or enhancing performance of reverse osmosis membranes immediately after manufacture would make the operation of such membranes more economical and reduce the production of products which do not meet the requisite membrane performance specifications.

SUMMARY OF THE INVENTION

A novel method for reducing salt passage through reverse osmosis membranes by treating said membranes with certain polymers has now been discovered. Unexpectedly, it has been found that this treatment in preferred embodiments can reduce salt passage by at least about 20 percent while decreasing water flux by not more than about 20 percent at standard reverse osmosis test conditions. In other embodiments, the treatment can enhance water flux by at least about 5 percent without substantially reducing salt rejection.

These treatments are particularly effective with "newly manufactured membranes". The term "newly manufactured membranes" denotes membranes which have not suffered a performance decline in service and have not been operated in a reverse osmosis process for a sufficient period so that deposits have formed on the surface which prevent good adsorption of the polymers on the membrane surface. The polymers are in some embodiments operable with membranes which have been in service, but treatment of such membranes is generally not preferred. Cleaning the reverse osmosis membrane by conventional techniques may improve the efficacy of the polymer treatment described herein with membrane which have been in service.

The treated membranes are also believed novel. The novel membranes claimed herein have an effective amount of a water-soluble, vinyl addition polymer deposited on the discriminating layer of the reverse osmosis membrane. Water-soluble, as defined herein means the polymer is soluble at a concentration of at least about 0.1 ppm, preferably at least about 1 ppm, by weight at the conditions it is being used to treat the reverse osmosis membrane. This vinyl addition polymer is derived from: (a) at least 5 weight percent of a monomer of the Formula I

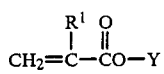 (I)

wherein $R^1$ is hydrogen, methyl, —CH$_2$OH or

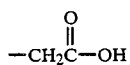

and Y is —H or

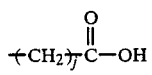

wherein j is an integer from 1 to 5: and (b) a remaining amount of a compatible ethylenically unsaturated monomer, with the proviso that where $R^1$ is hydrogen, then at least about 5 weight percent of (c) an ethylenically unsaturated monomer of the Formulae II or III

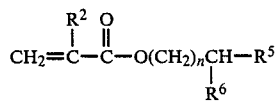 (II)

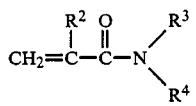 (III)

must be present, wherein $R^2$ at each occurrence is independently methyl, ethyl, hydrogen, or —CH$_2$OH: $R^5$ is —H, —OH, methyl or ethyl; $R^6$ is —OH, $-(OCH_2CH_2)_{\overline{m}}OH$, —NR$^7$R$^7$ or —CH$_2$OH; n is an integer from 1 to 3, preferably 1 to 2: m is an integer from 1 to 15, preferably 1 to 8: $R^7$ at each occurrence is independently —H, —CH$_3$, —CH$_2$CH$_3$ or —CH$_2$CH$_2$OH; $R^3$ is —H, $-(CH_2)_{\overline{k}}OH$, methyl or ethyl: $R^4$ is —H, $-(CH_2)_{\overline{k}}OH$, methyl or ethyl and k at each occurrence is an integer from 1 to 4, preferably 1 to 2, and wherein (a) and (c) together constitute at least about 50 weight percent of the polymer, more preferably at least about 80 weight percent and most preferably about 100 weight percent.

Desirably, the polymer treatment is effective to reduce salt passage by at least about 20 percent, more preferably at least about 30 percent. Advantageously, the polymer treatment decreases water flux by not more than about 20 percent, preferably less than about 10 percent at standard reverse osmosis conditions. Alternatively, the polymer may increase water flux through the membrane by at least about 5 percent, more preferably at least about 10 percent while increasing salt passage by no more than about 5 percent.

In another embodiment of this invention, a process is claimed for reducing the passage of salt and/or increasing the water flux through a reverse osmosis membrane. In this process, the discriminating layer of a reverse osmosis membrane is coated with a dilute solution of the aforementioned vinyl addition polymer at conditions which will cause said polymer to enhance the rejection of the reverse osmosis membrane and/or increase water flux through the membrane.

In yet another aspect, the subject invention comprises a process for selectively separating water from an aqueous mixture or solution using a reverse osmosis membrane which has been treated with a polymer in the manner described hereinbefore.

The improved membranes of this invention have been found to exhibit enhanced salt rejection relative to membranes which have not been coated with the subject polymers. Moreover, it has been unexpectedly found that these coating materials do not significantly reduce the water flux through the treated membranes. In certain preferred embodiments of the invention, the salt passage of the treated membranes will approach the theoretical salt passage of a defect-free discriminating layer of the same compositions as the membrane treated and the water flux of said layer will be the same or greater than the untreated discriminating layer alone.

One of the difficulties with prior art membranes is that, as the discriminating layer is made thinner, the water flux through the membrane is increased, but the probability of the discriminating layer having defects or discontinuities in said layer which increase salt passage likewise increases. While prior art treatments have resulted in reduced salt passage through the discriminating layer, these treatments have also generally significantly reduced the water flux through the membrane discriminating layer.

DETAILED DESCRIPTION OF THE INVENTION

Reverse osmosis membranes having discriminating layers fabricated from a variety of compositions are known in the prior art. These membranes are preferably either thin film composite membranes having a thin discriminating layer disposed on a porous support which provides mechanical strength, or may be asymmetric membranes with a thinner discriminating layer on a porous supporting layer of the same composition. Illustrative of prior art polyamide membranes are those disclosed in the background and in the teachings of U.S. Pat. No. 4,277,344, which is incorporated herein by reference. Other polyamide membranes operable in the subject method are described in U.S. Pat. Nos. 4,606,943 and 4,520,044, both of which are incorporated herein by reference.

Not all reverse osmosis membranes are benefited to the same degree by the treatment described herein. The efficacy of a particular treating agent on a specific membrane can readily be determined empirically. Aromatic or partially aromatic polyamide desalinizing layers are especially preferred for the treatments described herein.

In a preferred embodiment of this invention, the reverse osmosis membrane prior to treatment has a polyamide discriminating layer which can be prepared by reaction of an aromatic polyamine compound bearing an average of at least two primary amine groups and an aromatic polyfunctional acyl halide having an average of more than two acyl halide groups on an aromatic nucleus. More preferably, the acyl halide reactant is a trimesoyl halide or mixture thereof with isophthaloyl halide or terephthaloyl halide. Acyl halide, as used herein, refers to acyl bromide groups or, more preferably, acyl chloride groups. Most preferably, the acyl halide is at least 50 percent trimesoyl chloride.

The aromatic polyamine reactant in the polyamide membrane is desirably phenylene diamine. More preferably, the polyamine reactant is metaphenylene diamine. The membrane may also be derived in part from amines which are not aromatic, such as aliphatic diamine, aliphatic polyamine, cycloaliphatic diamine or cycloaliphatic polyamine reactants, for example piperazine. Mixtures of polyfunctional amines can also be used.

Another type of reverse osmosis membrane which is operable for treatment herein is a cellulose acetate membrane. Preferred are reverse osmosis membranes having a cellulose diacetate, cellulose triacetate or a mixed cellulose diacetate/triacetate discriminating layer. Such membranes are well known in the prior art and are available commercially from FilmTec Corporation or Toyobo Company, Ltd.

The sodium chloride rejection and water flux of the reverse osmosis membrane prior to treatment can operably vary over a considerable range. For convenience in reporting water flux and sodium chloride rejection, all of the values reported herein will be made with reference to standard test conditions using an aqueous 0.2 weight percent sodium chloride solution at 200 psig at 25° C. with a recovery of 5 percent for a spiral device and 1 percent for a hollow fiber device, unless otherwise indicated.

In one preferred embodiment of this invention, the reverse osmosis membrane prior to treatment hereunder will advantageously have a sodium chloride rejection of at least about 60 percent, preferably at least about 85 percent, more preferably at least about 90 percent and most preferably at least about 93 percent. Desirably, the water flux of the reverse osmosis membrane prior to treatment should be at least about 1 gallon per square foot per day (gfd), more preferably at least about 3 gfd and most preferably at least about 10 gfd.

Advantageously, the membrane to be treated has a discriminating layer which is not fouled and has not been treated with prior art rejection enhancing agents. This treatment can be used to restore some of the salt rejection lost by membranes in service, but preferably is used with membranes which have not been used extensively.

It should be noted that performance of reverse osmosis membranes may require a period of one or more hours after start-up to reach a steady state. Generally, the steady state values are reported hereinafter for water flux and sodium chloride rejection.

Surprisingly, it has been found that the membranes after the treatment described herein can exhibit significantly reduced sodium chloride passage and/or increased water flux. In preferred embodiments, the sodium chloride passage will approach the theoretical minimum obtainable with a continuous, defect-free layer of the same composition as the discriminating layer treated. In these preferred embodiments, the water flux of the discriminating layer is not adversely affected to any significant degree. In general, the water flux after the subject treatment declines by less than about 20 percent, more preferably less than about 10 percent and most preferably less than about 5 percent.

In some especially preferred embodiments of this invention, the water flux of a newly manufactured membrane is unaffected or may increase after treatment.

Reverse osmosis membranes are available in a variety of configurations. Flat sheet, tubular and hollow fiber membranes are well known in the art and all can be treated in the manner described herein.

Hydroxyethyl methacrylate, hydroxypropyl methacrylate and glycerol methacrylate are well-known and preferred compounds within the scope of Formula II. Dimethyl acrylamide, methacrylamide and acrylamide are well known and preferred compounds within the scope of Formula III. In both Formulae II and III, $R^2$ is preferably methyl. Preferably, the polymer includes at least 5 weight percent, more preferably 10 weight percent of the monomers of Formula II or III, more preferably those of Formula II. The vinyl addition polymer used herein to treat the reverse osmosis membranes will preferably bear a plurality of hydroxyl groups linked to the backbone of the polymer by a

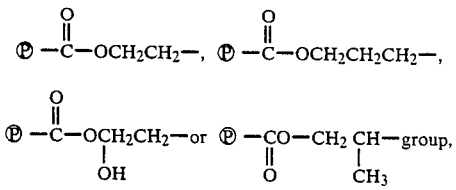

wherein $\textcircled{P}$ represents the polymer backbone.

The polymer used in the treatment of reverse osmosis membranes preferably includes at least about 10 weight percent, or preferably at least about 20 weight percent, of groups bearing a carboxylic acid moiety derived from the monomer of Formula I. These acids are generally known in the art. Preferably, the carboxylic acid groups are derived from ethylenically unsaturated carboxylic acids bearing a secondary carbon atom in the position adjacent to the carbonyl group of the carboxylic acid group. Methacrylic acid is particularly desirable as the carboxylic acid monomer. Methacrylic acid can be employed in mixtures with other acids including acrylic acid, itaconic acid, crotonic acid or maleic acid. These other acids are operable but not generally preferred. More preferably, at least about 5 weight percent of the carboxylic acid is methacrylic acid.

It is not fully understood as to why the instant treatments are effective. In order for the polymer used in treatment to impart the desired properties to the membrane, it is believed that the polymer should have a chemical structure which interacts with or has an affinity for the discriminating layer. The polymer must also exhibit the desired solubility in water. A standard measure of the relative hydrophilic and lyophilic character of the polymer is provided by calculating the hydrophilic lyophilic balance (HLB) of the repeating units of the polymer in accordance with J. T. Davies, *A Quantitative Kinetic Theory of Emulsion Type, I; Physical Chemistry of Emulsifying Agents; The Proceedings of the Second International Congress on Surface Activity*, Vol. 1, pp. 426–438, Academic Press, New York, N.Y. (1957). Polymers having HLB values for the repeating units in the range from 10.5 to about 34.9 have been found operable with from about 26.6 to about 34.9 being preferred.

The polymer used in treating the reverse osmosis membrane in addition to the monomers of Formulae I and II can optionally bear a remaining amount of compatible ethylenically unsaturated monomers. Compatible monomers are those which do not otherwise deleteriously affect the properties that the resulting polymer imparts to the reverse osmosis membrane following treatment. Illustrative compatible monomers include styrene, substituted styrene, esters of $\alpha\beta$-unsaturated carboxylic acids, vinyl methyl ether, acrylonitrile and vinylbenzyl chloride. Optionally, the polymer described herein can include moieties bearing pendant hydrophobes, such as dodecyl, phenyl, phenoxy, nonylphenyl or ethylene oxide oligomers. Other monomers which can be reacted include glycidyl methacrylate and vinyl acetate.

The compatible monomers can include moieties bearing an ionic charge, but this is not generally desirable. Advantageously, the compatible monomers are not crosslinking groups and the resulting polymer is not crosslinked.

Especially preferred polymers are those derived from compounds of Formula I wherein $R^1$ is methyl or

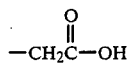

and Y is —H and compounds of Formula II or III wherein $R^2$ is methyl, n is 1 or 2, $R^5$ is —H, $R^6$ is —OH or $-(OCH_2CH_2)_{\overline{m}}OH$, m is an integer from 1 to 8, $R^3$ is —H or —$CH_3$ and $R^4$ is —H or —$CH_3$. Most preferred are polymers derived from hydroxyethyl methacrylate (HEMA) and methacrylic acid (MAA). Preferably, at least 5 weight percent HEMA methacrylamide or hydroxypropyl methacrylate is employed with MAA or itaconic acid. More preferably, the mole ratio of the methacrylic acid or itaconic acid to hydroxyethyl methacrylate, methacrylamide or hydroxypropyl methacrylate is in the range of from about 9:1 to 1:9. Especially preferred are polymers containing from about 40 to about 80 weight percent of compounds of Formula II or III, preferably hydroxyethyl methacrylate, and from about 60 to about 20 weight percent of methacrylic acid or itaconic acid. The optimum ratio of monomers will depend on the reverse osmosis membrane to be treated and can be determined empirically.

The molecular weight of the polymer applied in the treatment described herein is not generally critical. However, molecular weights in the range from about 1,000 to about 100,000 as determined by gel permeation chromatography are deemed convenient. Oligomers of very low molecular weight may not give the desired increase in salt rejection. Likewise, very high molecular or highly crosslinked polymers may reduce flux or deposit on the surface of the membrane in an undesirable manner.

The polymers described herein may be prepared by conventional vinyl addition polymerization processes. Conveniently, the monomers from which the polymers are derived are polymerized in a suitable liquid diluent in the presence of an appropriate initiator. Preferably, the polymers are not crosslinked.

The vinyl addition polymer can be applied to the reverse osmosis membrane in any diluent in which said polymer is soluble and which does not deleteriously affect the membrane. Conveniently, an aqueous solution at a pH which renders the polymer soluble is employed. Preferably, the aqueous solution used to apply the polymer is at a pH in the range from about six to about ten, more preferably about six to about nine.

Preferably, the polymer is present in the solution used to coat the membrane at a relatively dilute concentration. For example, a concentration in the range from about 0.1 to about 200 parts per million (ppm) by weight is typically operable, more preferably about 1 to about 100 ppm. More preferably, the polymer is present in a concentration from about 5 to about 50 parts per million.

The polymer solution may be applied to the reverse osmosis membrane by any convenient technique. In one preferred embodiment, the coating is applied to the membrane which has already been assembled into a membrane device. The coating solution is introduced to the device in a manner like that of an aqueous solution to be separated by the membrane. The polymer solution may optionally be applied under pressure. Transmembrane pressures in the range from about 50 to about 800 psig are convenient.

The temperature during polymer treatment is not generally critical, so long as neither the polymer nor the membrane are adversely affected. Conveniently, temperatures in the range from about 15° to about 30° C. are used during application of the polymer solution.

Optionally, the aqueous polymer solution applied to the membrane can contain other additives to improve dispersibility or application of the polymer to the membrane. For example, surfactants can be used, but are not generally preferred.

Also, sodium chloride or other like salts can be present in the polymer solution in a concentration from 0 to about 35,000 ppm.

The reverse osmosis membrane should be contacted with the polymer solution for a sufficient period to modify the membrane salt rejection. The optimum contact time can be readily determined empirically. The optimum time may vary depending upon the polymer concentration, flow rate of treating solution, temperature during contact with the membrane and other factors. Typically, a contact time of from about 15 minutes to several hours is operable for a polyamide membrane treated at a feed pressure of from about 100 to 800 psi with a solution of from about 1 to about 20 ppm of the polymer.

It is believed that the polymers used in the treatment of reverse osmosis membranes described herein can selectively plug discontinuities or defects in the discriminating layer of the reverse osmosis membrane which are too small for tannic acid to be effective as a rejection enhancing agent. These polymers in preferred embodiments show a unique ability to plug these discontinuities without forming a coating, affording significant resistance to water flux on the remainder of the membrane surface. In fact, some of these coatings actually enhance water flux. It is noteworthy that prior art coating, such as vinyl acetate polymers or tannic acid, are effective in reducing sodium chloride passage through defects in the membrane, but are believed to form a comparatively thick, essentially continuous coating on the membrane which reduces the overall water flux through the membrane. The subject polymer coatings appear to be especially useful in a treatment of reverse osmosis membranes intended for use with a seawater feed at a transmembrane pressure of 800 psi or above.

It has been observed that reverse osmosis membranes intended for use with a seawater feed may exhibit higher water fluxes after treatment than prior to treatment with the polymers described hereinbefore. Moreover, the salt passage through the sea water membranes and preferred embodiments of the invention may be significantly reduced. The best results appear to be obtained when using membranes substantially free from major defects or discontinuities. That is, membranes which have a salt rejection not less than 5 percent less than that of a discriminating layer of the same composition which is defect-free. The treatment described herein may improve the performance of membranes which prior to treatment have a significantly worse salt rejection. However, the flux through the membranes may be affected adversely to a greater degree.

The following examples are presented to illustrate but not otherwise limit the subject invention. All parts and percentages are by weight unless otherwise indicated. Salt rejection is reported in percent. NaCl passage is in percent and is calculated by subtracting NaCl rejection in percent from 100. Water flux is reported in gallons per square foot of membrane per day. The reverse osmosis tests were made using a feed water of 0.2 percent sodium chloride at a pressure of 200 psig and temperature of 25° C. unless otherwise indicated.

EXAMPLES 1-36

Cellulose triacetate hollow fibers assembled in a hollow fiber membrane loop cell device having a nominal capacity of 0.1 gallons per day (gpd) were treated with a solution containing 25 parts per million (ppm) of a homopolymer of methacrylic acid or copolymer of methacrylic acid containing from 0 percent up to 90 percent hydroxyethyl methacrylate (HEMA). The treating solution was maintained at a pH of 7.5 and also contained 2,000 ppm sodium chloride. The treating solution was applied to the feed side of the membrane at a pressure of 250 psig and at a temperature of 25° C. and the modules were operated to achieve about 1 percent recovery, i.e., the quotient of the permeate flow rate divided by the feed flow rate was equal to 0.01. Approximately 7 liters of the treatment solution were continuously recirculated on the feed water side of the modules during a 90-minute period. The aqueous solution permeating through the membranes and the stream rejected by the membranes were combined in this recirculated feed.

Both before and after treatment, the modules are tested to determine their salt rejection and water flux. The salt rejection of the modules and water flux of the modules before and after treatment are tabulated in Table I.

TABLE I

| Examples | Percent HEMA | Initial Salt Rejection | Initial Flux (GFD) | Final Salt Rejection (Percent) | Final Flux (GFD) |
|---|---|---|---|---|---|
| 1 | 0 | 95.3 | 8.1 | 95.7 | 8.4 |
| 2 | 0 | 93.8 | 8.2 | 94.7 | 8.4 |
| 3 | 0 | 95.9 | 6.9 | 96.3 | 7.5 |
| 4 | 0 | 96.0 | 8.4 | 96.4 | 8.4 |
| 5 | 10 | 96.2 | 8.3 | 96.2 | 8.5 |
| 6 | 10 | 95.7 | 8.0 | 96.0 | 7.7 |
| 7 | 10 | 96.3 | 8.0 | 97.1 | 5.4 |
| 8 | 10 | 96.8 | 8.7 | 98.3 | 6.6 |

TABLE I-continued

| Examples | Percent HEMA | Initial Salt Rejection | Initial Flux (GFD) | Final Salt Rejection (Percent) | Final Flux (GFD) |
|---|---|---|---|---|---|
| 9 | 10 | 96.1 | 8.2 | 96.1 | 8.0 |
| 10 | 10 | 95.4 | 8.1 | 95.4 | 7.8 |
| 11 | 40 | 96.2 | 8.1 | 96.3 | 7.8 |
| 12 | 40 | 94.6 | 8.5 | 95.0 | 8.1 |
| 13 | 40 | 95.4 | 7.1 | 95.7 | 7.0 |
| 14 | 40 | 94.8 | 6.5 | 95.3 | 6.5 |
| 15 | 60 | 93.7 | 8.5 | 95.1 | 8.2 |
| 16 | 60 | 95.0 | 8.7 | 96.1 | 8.3 |
| 17 | 60 | 95.5 | 8.1 | 97.7 | 7.7 |
| 18 | 60 | 94.7 | 8.1 | 97.3 | 7.5 |
| 19 | 60 | 93.7 | 8.4 | 94.9 | 8.0 |
| 20 | 60 | 94.3 | 8.5 | 95.2 | 8.1 |
| 21 | 70 | 96.6 | 8.5 | 96.6 | 8.4 |
| 22 | 70 | 94.9 | 9.2 | 97.7 | 7.6 |
| 23 | 70 | 95.2 | 6.6 | 95.7 | 7.1 |
| 24 | 70 | 94.1 | 7.1 | 95.3 | 7.5 |
| 25 | 70 | 95.2 | 8.2 | 96.3 | 7.7 |
| 26 | 70 | 95.1 | 7.6 | 96.3 | 6.9 |
| 27 | 85 | 96.1 | 9.1 | 97.9 | 8.3 |
| 28 | 85 | 95.4 | 8.9 | 97.5 | 8.1 |
| 29 | 85 | 95.6 | 7.8 | 96.3 | 6.8 |
| 30 | 85 | 95.6 | 7.9 | 95.8 | 6.6 |
| 31 | 85 | 94.8 | 8.9 | 96.3 | 8.2 |
| 32 | 85 | 95.0 | 8.0 | 96.7 | 7.2 |
| 33 | 90 | 94.1 | 7.8 | 96.0 | 7.3 |
| 34 | 90 | 94.2 | 8.5 | 96.2 | 8.2 |
| 35 | 90 | 93.6 | 8.0 | 96.7 | 8.5 |
| 36 | 90 | 94.7 | 8.2 | 97.2 | 8.6 |

It is apparent from the data tabulated in Table I that the treatment with hydroxethyl methacrylate/methacrylic acid copolymers can significantly enhance salt rejection of the membranes without much effect on the water flux through the membranes. The preferred compositions appear to be those containing about 60 to 70 percent hydroxyethyl methacrylate.

EXAMPLES 37-39

Commercial reverse osmosis membranes having a polyamide discriminating layer were treated in accordance with the method of this invention. The membranes treated were composite membranes in a spiral configuration having a discriminating layer prepared by the reaction of trimesoyl chloride with meta-phenylene diamine in the manner described in U.S. Pat. No. 4,277,344. These membranes are commercially available from FilmTec Corporation under the designation SW30-2514. The membranes were initially tested using an aqueous solution of 3.2 percent sodium chloride at 800 psig and a 5 percent recovery. The elements were then treated with an aqueous solution containing 10 ppm by weight of a hydroxyethyl methacrylate/methacrylic acid copolymer (HEMA/MAA) containing 60 percent hydroxyethyl methacrylate. The treatment was conducted at a pressure of 800 psig at a temperature of 25° C. for a period of about 15 minutes. In Table II are tabulated the water flux in gallons per day and salt passage of the membrane after ½ hour and the membrane after treatment with the polymer as described herein.

TABLE II

| | Untreated | | Post-Treatment | |
|---|---|---|---|---|
| Example | Flux | NaCl Passage | Flux | NaCl Passage |
| 37 | 115 | 3.0 | 104 | 2.2 |
| 38 | 110 | 4.2 | 105 | 2.0 |

TABLE II-continued

| Example | Untreated Flux | Untreated NaCl Passage | Post-Treatment Flux | Post-Treatment NaCl Passage |
| --- | --- | --- | --- | --- |
| 39 | 160 | 2.6 | 132 | 1.5 |

It is noted that the water flux of the membranes treated with the hydroxyethyl methacrylate/methacrylic acid copolymer declines by less than 15 percent while the salt passage through the tannic acid treated membranes decreases by about 40 percent on the average.

EXAMPLES 40–45

Approximately 8-square centimeter disks of a composite membrane like that in Example 37 were tested and treated in situ within a high pressure reverse osmosis test cell. Membranes were treated with 60/40 HEMA/MAA by feeding to the high pressure side of the membrane an aqueous solution at a pressure of 800 psig containing 25 ppm weight of the copolymer and 32,000 ppm by weight of NaCl. Membranes were tested both before and after treatment with a feed solution containing 32,000 ppm by weight of NaCl at a feed pressure of 800 psig. The results are tabulated in Table III.

TABLE III

| Example | NaCl Passage Untreated | NaCl Passage Treated | Flux (gfd) Untreated | Flux (gfd) Treated |
| --- | --- | --- | --- | --- |
| 40 | 1.1 | 0.6 | 8.5 | 9.5 |
| 41 | 1.5 | 0.6 | 9.6 | 10.2 |
| 42 | 3.0 | 1.7 | 5.4 | 6.9 |
| 43 | 8.8 | 1.7 | 6.1 | 7.5 |
| 44 | 2.0 | 1.4 | 6.6 | 9.7 |
| 45 | 1.7 | 1.2 | 6.7 | 9.8 |

Examples 40–45 demonstrate that, in some preferred embodiments of this invention, the subject treatment can both reduce salt passage and increase water flux relative to the membrane prior to treatment.

EXAMPLES 46–49

Approximately 8-square centimeter disks of a brackish water membrane composite similar in composition to that in Example 37 were tested and treated in situ within a high pressure reverse osmosis test cell. Membranes were treated with 60/40 HEMA/MAA by feeding to the high pressure side of the membrane an aqueous solution at a pressure of 800 psig containing 25 ppm weight of the copolymer and 32,000 ppm by weight of NaCl. Membranes were tested both before and after treatment with a feed solution containing 32,000 ppm by weight of NaCl at a feed pressure of 800 psig. The flux and salt passage of the membrane prior to and after treatment are tabulated in Table IV.

TABLE IV

| Example | NaCl Passage Untreated | NaCl Passage Treated | Flux (gfd) Untreated | Flux (gfd) Treated |
| --- | --- | --- | --- | --- |
| 46 | 8.0 | 1.4 | 17.3 | 18.3 |
| 47 | 8.7 | 6.6 | 16.7 | 18.2 |
| 48 | 7.2 | 5.3 | 13.9 | 19.9 |
| 49 | 7.0 | 5.0 | 13.9 | 19.8 |

Examples 46–49 demonstrate that, in some preferred embodiments of this invention, the subject treatment can both reduce salt passage and increase water flux of the membrane.

EXAMPLES 50–57

Approximately 8-square centimeter disks of a composite membrane like that in Example 46 were tested and treated in situ within a high pressure reverse osmosis test cell. Membranes were treated with 60/40 HEMA/MAA by feeding to the high pressure side of the membrane an aqueous solution at a pressure of 250 psig containing 25 ppm by weight of the copolymer and 2,000 ppm by weight of NaCl. Membranes were tested both before and after treatment with a feed solution containing 2,000 ppm by weight of NaCl at a feed pressure of 250 psig. The NaCl passage and flux before and after treatment are tabulated in Table V.

TABLE V

| Example | NaCl Passage Untreated | NaCl Passage Treated | Flux (gfd) Untreated | Flux (gfd) Treated |
| --- | --- | --- | --- | --- |
| 50 | 3.8 | 2.5 | 29.2 | 30.2 |
| 51 | 4.5 | 2.4 | 28.4 | 28.9 |
| 52 | 4.2 | 2.8 | 36.1 | 21.0 |
| 53 | 4.3 | 2.9 | 34.5 | 20.3 |
| 54 | 5.9 | 4.9 | 34.6 | 33.0 |
| 55 | 5.4 | 4.3 | 32.7 | 31.4 |
| 56 | 5.3 | 4.9 | 34.0 | 31.8 |
| 57 | 3.5 | 3.9 | 30.8 | 28.4 |

Examples 50–57 demonstrate that there is considerable variation on how individual membrane samples respond to treatment. Some membranes showed increases in flux after treatment (Examples 50 and 51), while others exhibited significant declines (Examples 52 and 53).

EXAMPLES 58–85

Approximately 8-square centimeter disks of a membrane like that in Example 37 were tested and treated in situ within a high pressure reverse osmosis test cell. Membranes were treated with a copolymer by feeding to the high pressure side of the membrane an aqueous solution at a pressure of 250 psig containing 25 ppm weight of the copolymer and 2,000 ppm by weight of NaCl. Membranes were tested both before and after treatment with a feed solution containing 2,000 ppm by weight of NaCl at a feed pressure of 250 psig. The copolymers contained the weight percent of HEMA tabulated in Table VI and a remaining amount of methacrylic acid. The NaCl passage and flux before and after treatment are also tabulated.

TABLE VI

| Example | % HEMA | NaCl Passage Untreated | NaCl Passage Treated | Flux (gfd) Untreated | Flux (gfd) Treated |
| --- | --- | --- | --- | --- | --- |
| 58 | 0 | 3.2 | 2.2 | 56.7 | 49.4 |
| 59 | 0 | 4.3 | 2.3 | 56.3 | 50.6 |
| 60 | 0 | 10.6 | 2.4 | 58.8 | 47.7 |
| 61 | 0 | 7.9 | 2.7 | 55.6 | 46.8 |
| 62 | 10 | 3.1 | 2.3 | 45.8 | 41.5 |

TABLE VI-continued

| Example | % HEMA | NaCl Passage Untreated | NaCl Passage Treated | Flux (gfd) Untreated | Flux (gfd) Treated |
|---|---|---|---|---|---|
| 63 | 10 | 2.7 | 2.3 | 46.3 | 40.4 |
| 64 | 10 | 5.4 | 2.2 | 45.7 | 43.1 |
| 65 | 10 | 3.2 | 2.4 | 45.2 | 42.8 |
| 66 | 40 | 3.0 | 2.7 | 44.2 | 39.5 |
| 67 | 40 | 2.6 | 2.3 | 41.1 | 35.5 |
| 68 | 60 | 3.1 | 1.7 | 40.3 | 37.9 |
| 69 | 60 | 2.9 | 1.8 | 34.7 | 35.3 |
| 70 | 60 | 3.0 | 2.2 | 43.9 | 46.9 |
| 71 | 60 | 2.7 | 2.2 | 42.5 | 44.3 |
| 72 | 70 | 4.6 | 2.2 | 34.3 | 24.1 |
| 73 | 70 | 6.0 | 2.6 | 49.4 | 34.7 |
| 74 | 70 | 3.2 | 2.4 | 46.1 | 39.2 |
| 75 | 70 | 3.5 | 2.7 | 45.3 | 39.5 |
| 76 | 85 | 5.2 | 2.6 | 54.7 | 60.0 |
| 77 | 85 | 6.5 | 2.7 | 54.4 | 50.5 |
| 78 | 85 | 2.9 | 2.7 | 42.4 | 41.9 |
| 79 | 85 | 2.9 | 3.2 | 42.4 | 41.9 |
| 80 | 90 | 3.5 | 2.0 | 52.7 | 40.6 |
| 81 | 90 | 5.8 | 3.1 | 51.8 | 43.1 |
| 82 | 90 | 3.5 | 2.4 | 47.9 | 28.6 |
| 83 | 90 | 3.5 | 2.1 | 43.5 | 25.9 |
| 84 | 90 | 2.5 | 2.2 | 42.7 | 37.1 |
| 85 | 90 | 2.7 | 2.4 | 43.0 | 37.0 |

Examples 58-85 demonstrate that the composition of the polymer used for treatment affects the membrane characteristics. Still, there was considerable individual variation. Copolymers containing from about 10 to about 85 weight percent HEMA appeared to be preferred with these membranes.

EXAMPLE 86

A brackish water membrane sold by E. I. duPont de Nemours and Company was obtained. This membrane is believed to be a polyamide. The product water conductivity of the membrane was measured at 300 psi using feed having a conductivity of 5,500 $\mu$s. Then the membrane was treated with 10 ppm 60:40 HEMA/MAA copolymer at 300 psi, but no significant change in product water conductivity was observed. This may be because the membrane could have been treated previously with other rejection enhancing agents. Generally, the subject treatment is most effective with discriminating layers which have not been treated with prior art rejection enhancing agents.

EXAMPLES 87-132

Membranes like those in Example 37 were treated with 25 ppm of a 1:1 mole ratio copolymer selected from those tabulated in Table VII. The copolymer was applied in an aqueous solution with 2,000 ppm NaCl at 250 psi pressure at a pH in the range from 7.0 to 7.7 for 90 minutes. The membranes were tested both before and after treatment at both brackish water (BW) (2,000 ppm NaCl, 250 psi) and seawater (SW) conditions (32,000 ppm NaCl, 800 psi). The fluxes are reported in gallons per square foot per day. The results are tabulated in Table VII. The abbreviations used in Table VII are as follows: HPMA is hydroxypropyl methacrylate; GMA is glycerol methacrylate: AA is acrylic acid: MAA is methacrylic acid: HEMA is hydroxyethyl methacrylate: HEM-S is

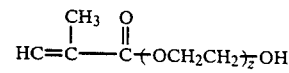

wherein the average value of z is 5: AEM is aminoethyl methacrylate; HPA is hydroxypropyl acrylate: ITA is itaconic acid: EMA is ethyl methacrylate: MAm is methyl acrylamide and AAm is acrylamide.

TABLE VII

| Example | Copolymer | SW Salt Passage Untreated | SW Salt Passage Treated | SW Flux Untreated | SW Flux Treated | BW Salt Passage Untreated | BW Salt Passage Treated | BW Flux Untreated | BW Flux treated |
|---|---|---|---|---|---|---|---|---|---|
| 87 | HPMA/AA | 3.65 | 3.44 | 14 | 15 | 2.90 | 1.97 | 18 | 18 |
| 88 | HPMA/AA | 3.28 | 2.57 | 16 | 17 | 2.69 | 1.60 | 20 | 21 |
| 89 | HPMA/AA | 1.94 | 1.89 | 20 | 21 | 2.18 | 1.45 | 20 | 20 |
| 90 | HPMA/AA | 2.23 | 2.18 | 20 | 21 | 2.49 | 1.75 | 20 | 20 |
| 91 | HEMA/MAA[1] | 1.56 | 1.86 | 19 | 15 | 1.88 | 1.51 | 17 | 18 |
| 92 | HEMA/MAA[1] | 1.79 | 2.10 | 20 | 15 | 2.17 | 1.60 | 18 | 18 |
| 93 | HEMA/MAA[2] | 2.18 | 1.76 | 18 | 19 | 2.42 | 1.73 | 17 | 16 |
| 94 | HEMA/MAA[2] | 2.01 | 1.53 | 18 | 18 | 1.97 | 1.57 | 17 | 16 |
| 95 | HEMA/MAA[2] | 2.63 | 1.69 | 23 | 20 | 1.92 | 1.47 | 19 | 20 |
| 96 | HEMA/MAA[2] | 2.71 | 1.60 | 22 | 19 | 1.99 | 1.49 | 18 | 18 |
| 97 | HEMA/MAA[3] | 1.57 | 1.69 | 19 | 21 | 3.18 | 1.37 | 19 | 18 |
| 98 | HEMA/MAA[3] | 1.80 | 1.83 | 19 | 27 | 2.57 | 1.53 | 21 | 20 |
| 99 | HEMA/AA | 1.33 | 2.15 | 20 | 20 | 2.89 | 1.90 | 19 | 20 |
| 100 | HEMA/AA | 1.73 | 1.96 | 20 | 20 | 2.54 | 1.83 | 19 | 20 |
| 101 | HEMA/AA | 2.04 | 2.19 | 22 | 16 | 1.98 | 1.51 | 17 | 16 |
| 102 | HEMA/AA | 2.14 | 2.26 | 25 | 17 | 2.37 | 1.52 | 18 | 18 |
| 103 | GMA/MAA | 2.80 | 1.87 | 21 | 20 | 2.77 | 1.57 | 19 | 19 |
| 104 | GMA/MAA | 1.97 | 1.69 | 21 | 20 | 1.95 | 1.36 | 20 | 21 |
| 105 | GMA/MAA | 2.16 | 2.31 | 21 | 18 | 2.09 | 1.83 | 20 | 20 |
| 106 | GMA/MAA | 2.85 | 2.25 | 18 | 19 | 1.93 | 1.74 | 20 | 20 |
| 107 | HEM-S/MAA | 5.42 | 2.71 | 22.4 | 20.4 | 3.8 | 1.9 | 21.0 | 20.8 |
| 108 | HEM-S/MAA | 3.90 | 2.75 | 21.7 | 20.1 | 3.12 | 1.68 | 20.7 | 20.9 |
| 109 | HEM-S/MAA | 4.33 | 1.17 | 24.5 | 20.9 | 4.06 | 3.48 | 21.9 | 21.8 |
| 110 | HEM-S/MAA | 2.24 | 2.33 | 23.4 | 20.3 | 2.44 | 1.90 | 21.7 | 21.7 |
| 111 | AEM/MAA | 2.57 | 2.62 | 18.0 | 19.2 | 2.96 | 1.93 | 19.6 | 16.6 |
| 112 | AEM/MAA | 2.43 | 2.20 | 19.3 | 20.6 | 2.52 | 1.80 | 19.3 | 16.4 |
| 113 | AEM/MAA | 3.36 | 24.26 | 16.0 | 24.8 | 4.84 | 2.30 | 19.9 | 16.1 |
| 114 | AEM/MAA | 3.45 | 2.89 | 17.1 | 22.1 | 3.77 | 2.04 | 22.1 | 17.2 |
| 115 | AEM/MAA | 2.74 | 1.75 | 19.7 | 19.3 | 2.72 | 2.61 | 19.9 | 12.9 |
| 116 | HPA/MAA | 3.18 | 3.23 | 17.1 | 17.5 | 3.12 | 2.40 | 18.2 | 17.2 |
| 117 | HPA/MAA | 3.77 | 3.69 | 17.7 | 18.0 | 3.61 | 3.46 | 19.0 | 17.6 |
| 118 | HPA/MAA | 2.70 | 2.66 | 17.0 | 17.2 | 2.92 | 2.46 | 17.1 | 16.4 |
| 119 | HPA/MAA | 2.19 | 2.16 | 13.2 | 14.1 | 2.94 | 2.10 | 13.2 | 12.5 |
| 120 | HEMA/ITA | 3.04 | 5.82 | 16.6 | 18.4 | 3.27 | 2.12 | 18.7 | 18.3 |
| 121 | HEMA/ITA | 2.27 | 2.25 | 21.3 | 21.5 | 3.11 | 1.61 | 21.7 | 22.0 |

TABLE VII-continued

| | | SW Salt Passage | | SW Flux | | BW Salt Passage | | BW Flux | |
|---|---|---|---|---|---|---|---|---|---|
| Example | Copolymer | Untreated | Treated | Untreated | Treated | Untreated | Treated | Untreated | treated |
| 122 | HEMA/ITA | 2.25 | 2.30 | 17.8 | 19.9 | 1.75 | 1.61 | 19.7 | 20.6 |
| 123 | MAA/EMA | 3.28 | 2.71 | 20.1 | 20.0 | 2.18 | 1.62 | 19.6 | 18.9 |
| 124 | MAA/EMA | 3.61 | 2.44 | 22.3 | 21.9 | 2.08 | 1.45 | 21.3 | 20.9 |
| 125 | MAA/EMA | 3.57 | 2.27 | 17.5 | 21.8 | 2.10 | 1.39 | 20.4 | 22.3 |
| 126 | MAA/MAm | 3.41 | 2.48 | 18.7 | 19.0 | 2.38 | 1.57 | 20.4 | 20.9 |
| 127 | MAA/MAm | 2.55 | 2.21 | 18.4 | 19.1 | 2.59 | 1.66 | 20.1 | 20.4 |
| 128 | MAA/MAm | 3.33 | 2.22 | 17.9 | 17.4 | 1.94 | 1.39 | 19.9 | 20.3 |
| 129 | MAA/AAm | 2.57 | 2.20 | 18.8 | 17.2 | 1.78 | 1.17 | 20.4 | 18.8 |
| 130 | MAA/AAm | 2.80 | 2.18 | 19.0 | 17.8 | 1.83 | 1.26 | 20.4 | 19.6 |
| 131 | MAA/AAm | 2.94 | 2.10 | 17.2 | 16.7 | 2.38 | 1.28 | 18.4 | 19.5 |
| 132 | MAA/AAm | 2.74 | 2.47 | 17.2 | 16.8 | 2.83 | 1.67 | 18.1 | 19.2 |

[1] Low molecular weight
[2] Moderate molecular weight
[3] High molecular weight The HPMA/AA, HEMA/AA and low and high molecular weight HEMA/MAA, AEM/MAA, HPA/MAA copolymers appeared more effective in the brackish water than the seawater tests.

EXAMPLES 133-180

In a manner generally similar to Examples 87-132, except that a membrane of similar composition designated for seawater applications was treated, membranes were prepared and tested. The results are tabulated in Table VIII.

TABLE VIII

| | | SW Salt Passage | | SW Flux | | BW Salt Passage | | BW Flux | |
|---|---|---|---|---|---|---|---|---|---|
| Example | Copolymer | Untreated | Treated | Untreated | Treated | Untreated | Treated | Untreated | treated |
| 133 | HPMA/AA | 1.95 | 0.82 | 7.5 | 8.9 | 2.06 | 0.76 | 6.9 | 7.4 |
| 134 | HPMA/AA | 2.72 | 0.81 | 7.9 | 9.1 | 1.84 | 0.68 | 7.3 | 7.7 |
| 135 | HPMA/AA | 2.25 | 0.65 | 9.0 | 11.0 | 1.92 | 0.91 | N.D. | 7.1 |
| 136 | HPMA/AA | 11.25 | 1.05 | 9.1 | 10.5 | 7.30 | 1.63 | 6.6 | 6.6 |
| 137 | HEMA/MAA[1] | 1.12 | 0.87 | 7.4 | 7.1 | 7.07 | 1.63 | 5.4 | 5.5 |
| 138 | HEMA/MAA[1] | 0.85 | 0.92 | 6.6 | 6.3 | 13.50 | 1.48 | 4.1 | 4.4 |
| 139 | HEMA/MAA[2] | 1.06 | 0.46 | 7.0 | 7.7 | 14.95 | 0.76 | 4.5 | 4.7 |
| 140 | HEMA/MAA[2] | 1.04 | 0.68 | 6.5 | 7.3 | 9.28 | 1.80 | 4.5 | 4.7 |
| 141 | HEMA/MAA[2] | 2.12 | 0.74 | 7.5 | 8.7 | 6.77 | 0.99 | 5.2 | 4.6 |
| 142 | HEMA/MAA[2] | 1.28 | 0.60 | 8.0 | 8.4 | 2.48 | 1.11 | 5.1 | 5.2 |
| 143 | HEMA/MAA[3] | 3.15 | 0.89 | 7.2 | 10.4 | 6.49 | 1.23 | 6.0 | 6.0 |
| 144 | HEMA/MAA[3] | 0.77 | 0.98 | 6.4 | 8.9 | 13.12 | 0.93 | 4.5 | 4.4 |
| 145 | HEMA/AA | 0.77 | 0.75 | 6.9 | 9.8 | 7.76 | 1.50 | 4.8 | 5.3 |
| 146 | HEMA/AA | 0.63 | 0.74 | 7.1 | 10.1 | 9.29 | 1.31 | 5.3 | 5.7 |
| 147 | HEMA/AA | 0.74 | 0.69 | 7.0 | 8.3 | 3.38 | 1.25 | 2.9 | 5.7 |
| 148 | HEMA/AA | 0.83 | 0.87 | 7.5 | 8.1 | 2.21 | 1.33 | 3.1 | 5.6 |
| 149 | GMA/MAA | 1.20 | 0.70 | 9.5 | 11.2 | 5.80 | 1.14 | 6.6 | 6.6 |
| 150 | GMA/MAA | 7.06 | 0.93 | 7.8 | 11.3 | 16.71 | 0.88 | 6.5 | 7.0 |
| 151 | GMA/MAA | 1.62 | 0.84 | 8.8 | 10.1 | 1.00 | 0.67 | 7.2 | 7.2 |
| 152 | GMA/MAA | 3.22 | 1.01 | 8.5 | 10.0 | 1.63 | 0.99 | 7.0 | 7.0 |
| 153 | HEM-S/MAA | 3.59 | 0.78 | 7.3 | 8.4 | 3.77 | 1.08 | 5.2 | 5.8 |
| 154 | HEM-S/MAA | 5.52 | 0.92 | 7.9 | 8.8 | 4.88 | 1.17 | 5.4 | 5.5 |
| 155 | HEM-S/MAA | 3.79 | 1.17 | 9.4 | 10.1 | 5.64 | 2.30 | 5.9 | 6.4 |
| 156 | HEM-S/MAA | 1.58 | 0.81 | 9.4 | 10.2 | 2.10 | 1.16 | 6.1 | 6.1 |
| 157 | AEM/MAA | 1.39 | 0.87 | 6.5 | 8.3 | 3.68 | 1.92 | 4.3 | 4.4 |
| 158 | AEM/MAA | 1.39 | 0.94 | 6.3 | 8.2 | 3.49 | 1.85 | 4.4 | 4.4 |
| 159 | AEM/MAA | 1.18 | 1.41 | 6.1 | 9.8 | 3.65 | 3.60 | 5.7 | 5.2 |
| 160 | AEM/MAA | 0.83 | 0.82 | 6.8 | 9.6 | 2.00 | 2.60 | 5.6 | 5.3 |
| 161 | AEM/MAA | 1.13 | 0.55 | 6.4 | 8.6 | 3.01 | 1.48 | 4.2 | 4.9 |
| 162 | AEM/MAA | 1.01 | 0.49 | 7.3 | 11.5 | 3.39 | 2.17 | 4.6 | 4.5 |
| 163 | HPA/MAA | 1.00 | 0.88 | 7.4 | 9.3 | 1.58 | 1.61 | 6.2 | 6.2 |
| 164 | HPA/MAA | 1.00 | 0.98 | 7.4 | 8.4 | 1.69 | 1.29 | 5.6 | 5.5 |
| 165 | HPA/MAA | 0.97 | 0.84 | 7.3 | 8.8 | 1.16 | 0.94 | 6.0 | 6.0 |
| 166 | HPA/MAA | 1.12 | 1.06 | 6.9 | 8.4 | 1.72 | 1.00 | 5.6 | 5.6 |
| 167 | HEMA/ITA | 1.10 | 1.07 | 7.7 | 9.5 | 2.70 | 1.47 | 5.7 | 5.8 |
| 168 | HEMA/ITA | 1.91 | 2.34 | 6.5 | 8.8 | 4.42 | 2.13 | 4.9 | 5.0 |
| 169 | HEMA/ITA | 0.92 | 0.71 | 8.3 | 10.4 | 1.34 | 1.00 | 6.9 | 7.1 |
| 170 | HEMA/ITA | 1.27 | 1.18 | 9.0 | 11.0 | 1.84 | 1.32 | 7.3 | 7.7 |
| 171 | HEMA/ITA | 1.18 | 1.49 | 8.2 | 9.0 | 2.39 | 9.35 | 6.2 | 9.3 |
| 172 | MAA/EMA | 1.11 | 0.66 | 7.8 | 8.6 | 1.05 | 0.77 | 5.6 | 5.7 |
| 173 | MAA/EMA | 1.27 | 0.69 | 7.3 | 8.2 | 3.55 | 2.16 | 5.3 | 5.3 |
| 174 | MAA/EMA | 1.72 | 0.58 | 7.4 | 10.2 | 2.15 | 1.25 | 4.9 | 5.0 |
| 175 | MAA/MAm | 2.49 | 0.87 | 6.5 | 7.6 | 6.05 | 2.97 | 4.8 | 4.9 |
| 176 | MAA/MAm | 5.64 | 1.19 | 6.1 | 7.3 | 3.47 | 1.49 | 4.8 | 5.0 |
| 177 | MAA/MAm | 6.99 | 1.29 | 6.7 | 7.7 | 3.33 | 1.27 | 5.1 | 5.3 |
| 178 | MAA/AAm | 0.81 | 0.75 | 7.0 | 6.6 | 1.19 | 0.88 | 5.0 | 4.8 |
| 179 | MAA/AAm | 2.59 | 0.90 | 6.6 | 7.8 | 3.02 | 1.15 | 5.2 | 5.4 |

TABLE VIII-continued

| Example | Copolymer | SW Salt Passage Untreated | SW Salt Passage Treated | SW Flux Untreated | SW Flux Treated | BW Salt Passage Untreated | BW Salt Passage Treated | BW Flux Untreated | BW Flux treated |
|---|---|---|---|---|---|---|---|---|---|
| 180 | MAA/AAM | 4.77 | 0.89 | 6.0 | 7.3 | 8.46 | 2.23 | 4.8 | 5.0 |

[1] Low molecular weight
[2] Moderate molecular weight
[3] High molecular weight
N.D. — Not determined

EXAMPLES 181–223

Brackish water cellulose triacetate hollow fiber membranes were treated with aqueous solutions of 25 ppm 1:1 copolymers, 2,000 ppm NaCl at a pH of 7.0 to 7.7 for 90 minutes at 250 psi. These copolymers are like those described in Examples 87–132. The membranes were tested before and after treatment at brackish water conditions. The results are tabulated in Table IX.

TABLE IX

| Example | Copolymer | BW Salt Passage Untreated | BW Salt Passage Treated | BW Flux Untreated | BW Flux Treated |
|---|---|---|---|---|---|
| 181 | HPMA/AA | 7.24 | 7.14 | 8.3 | 7.6 |
| 182 | HPMA/AA | 7.98 | 6.95 | 6.1 | 5.5 |
| 183 | HEMA/AA | 7.33 | 3.20 | 7.7 | 5.5 |
| 184 | HEMA/AA | 8.23 | 2.61 | 8.2 | 5.3 |
| 185 | HEMA/AA | 5.44 | 3.65 | 5.7 | 3.5 |
| 186 | HEMA/AA | 6.16 | 5.33 | 6.5 | 5 |
| 187 | HEMA/AA | 12.10 | 25.00 | 8.4 | 6.3 |
| 188 | HEMA/AA | 9.36 | 17.10 | 7.0 | 5.8 |
| 189 | HEMA/AA | 7.20 | 7.41 | 7.6 | 5.4 |
| 190 | HEMA/AA | 7.40 | 7.03 | 6.6 | 4.8 |
| 191 | HEMA/AA | 9.00 | 7.64 | 4.0 | 3.9 |
| 192 | HEMA/AA | 7.20 | 5.32 | 8.7 | 8.3 |
| 193 | HEMA/AA | 10.30 | 8.53 | 7.5 | 7.2 |
| 194 | HEMA/AA | 7.50 | 6.30 | 7.9 | 7.6 |
| 195 | GMA/MAA | 7.18 | 6.10 | 7.2 | 7.7 |
| 196 | GMA/MAA | 7.23 | 6.40 | 5.2 | 5.4 |
| 197 | GMA/MAA | 14.10 | 4.55 | 8.2 | 7.2 |
| 198 | GMA/MAA | 13.40 | 5.03 | 7.2 | 5.2 |
| 199 | GMA/MAA | 7.42 | 6.35 | 7.2 | 6.4 |
| 200 | GMA/MAA | 7.75 | 6.09 | 7.5 | 6.7 |
| 201 | GMA/MAA | 8.27 | 5.94 | 8.2 | 7.6 |
| 202 | GMA/MAA | 6.50 | 4.89 | 8.5 | 7.9 |
| 203 | GMA/MAA | 7.42 | 4.78 | 6.8 | 6.5 |
| 204 | GMA/MAA | 8.08 | 4.76 | 8.6 | 8.3 |
| 205 | GMA/MAA | 5.03 | 5.83 | 8.5 | 7.9 |
| 206 | GMA/MAA | 6.28 | 5.86 | 8.6 | 8.1 |
| 207 | HEM-S/MAA | 8.61 | 8.85 | 17.7 | 15.3 |
| 208 | HEM-S/MAA | 7.51 | 5.67 | 15.4 | 14.5 |
| 209 | HEM-S/MAA | 7.08 | 8.72 | 7.6 | 15.6 |
| 210 | AEM/MAA | 11.63 | 8.20 | 12.9 | 13.3 |
| 211 | AEM/MAA | 11.78 | 7.20 | 16.3 | 15.0 |
| 212 | AEM/MAA | 10.70 | 7.70 | 14.8 | 12.3 |
| 213 | HPA/MAA | 11.47 | 9.88 | 17.3 | 16.3 |
| 214 | HPA/MAA | 14.60 | 12.46 | 17.3 | 17.3 |
| 215 | HEMA/ITA | 7.44 | 5.93 | 16.9 | 16.9 |
| 216 | HEMA/ITA | 11.46 | 7.73 | 15.6 | 15.6 |
| 217 | HEMA/ITA | 5.70 | 5.35 | 15.5 | 14.9 |
| 218 | MAA/MAm | 13.31 | 9.95 | 16.3 | 16.2 |
| 219 | MAA/MAm | 12.09 | 9.92 | 18.2 | 17.9 |
| 220 | MAA/MAm | 14.73 | 5.98 | 17.4 | 15.3 |
| 221 | MAA/AAm | 17.31 | 10.53 | 18.5 | 17.1 |
| 222 | MAA/AAm | 21.66 | 16.57 | 18.0 | 15.8 |
| 223 | MAA/AAm | 12.98 | 4.90 | 16.9 | 14.1 |

What is claimed is:

1. In a reverse osmosis membrane having a sodium chloride rejection of at least about 60 percent at standard test conditions, the improvement comprising an effective amount of a water-soluble, vinyl-addition polymer deposited on the membrane discriminating layer sufficient for enabling a reduction in salt passage by at least about 20 percent while decreasing water flux by not more than about 20 percent at standard reverse osmosis test conditions or enabling an increase in water flux by at least 5 percent without any substantial increase in salt passage, wherein said polymer is derived from:

(a) at least about 5 weight percent of a carboxylic acid monomer of the formula

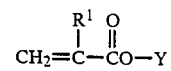

wherein $R^1$ is hydrogen, methyl, —CH$_2$OH or

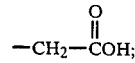

and Y is —H or

wherein j is an integer from 1 to 5: and (b) a remaining amount of a compatible ethylenically unsaturated monomer, with the proviso that where $R^1$ is hydrogen, then at least 5 weight percent of (c) an ethylenically unsaturated monomer of the Formula II or III

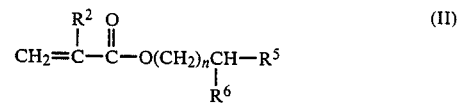

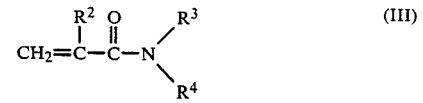

must be present, wherein $R^2$ at each occurrence is independently methyl, ethyl, or —CH$_2$OH: $R^5$ is —H, —OH, methyl or ethyl: $R^6$ is —OH, —(OCH$_2$CH$_2$)$_m$OH, —NR$^7$R$^7$ or —CH$_2$OH; n is an integer from 1 to 3; m is an integer from 1 to 15; $R^7$ is at each occurrence independently —H, —CH$_3$, —CH$_2$CH$_3$ or —CH$_2$CH$_2$OH: $R^3$ is —H, —(CH$_2$)$_k$OH, methyl or ethyl: $R^4$ is —H, —(CH$_2$)$_k$OH, methyl or ethyl and k at each occurrence is an integer from 1 to 4, and wherein (a) and (c) together account for at least about 50 weight percent of the monomers from which the vinyl-addition polymer is derived.

2. The improved membrane as described in claim 1 wherein the discriminating layer of the membrane is cellulose diacetate or cellulose triacetate and (a) and (c) together account for at least 80 weight percent of the monomers from which the vinyl addition polymer is derived.

3. The improved membrane as described in claim 2 wherein $R^1$ is methyl, Y is —H, $R^2$ is methyl, n is 1, $R^5$ is —H and $R^6$ is —OH and the vinyl addition polymer is a copolymer of the monomers (a) and (c).

4. The improved membrane as described in claim 1 wherein the discriminating layer of the membrane is a polyamide.

5. The improved membrane as described in claim 1 wherein the discriminating layer is an aromatic or partially aromatic polyamide and (a) and (c) together account for at least 80 percent of the monomers from which the vinyl addition polymer is derived.

6. The improved membrane as described in claim 5 wherein the membrane is a newly prepared membrane and the discriminating layer of the membrane is derived from an acyl halide comprising at least about 50 weight percent trimesoyl chloride reacted with phenylene diamine.

7. The improved membrane as described in claim 1 wherein $R^1$ is methyl or

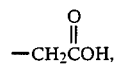

Y is —H or $R^2$ is methyl: n is 1 or 2, $R^5$ is —H and $R^6$ is —OH or —(OCH$_2$CH$_2$)$_m$OH, wherein m is an integer from 1 to 8, $R^3$ and $R^4$ are each —H or methyl, and the polymer contains at least about 5 weight percent of groups derived from Formula II or III.

8. The improved membrane as described in claim 7 wherein the polymer is derived from about 40 to about 80 weight percent of the compound of Formula II or III and from about 60 to about 20 weight percent of methacrylic acid or itaconic acid.

9. The improved membrane as described in claim 8 wherein $R^1$ is methyl, Y is —H, (c) is a monomer of Formula II, $R^2$ is methyl, n is 1, , $R^5$ is —H and $R^6$ is —OH.

10. The improved membrane as described in claim 6 wherein the discriminating layer of the membrane is derived from an acyl halide comprising at least about 50 weight percent trimesoyl chloride reacted with phenylene diamine and the reverse osmosis membrane prior to treatment has a sodium chloride rejection of at least 85 percent at standard test conditions.

* * * * *

UNITED STATES PATENT AND TRADEMARK OFFICE
CERTIFICATE OF CORRECTION

PATENT NO. : 4,828,700

DATED : May 9, 1989

INVENTOR(S) : Richard F. Fibiger; Michael J. Colucci; and David J. Forgach

It is certified that error appears in the above-identified patent and that said Letters Patent is hereby corrected as shown below:

In Claim 7, column 20, line 6, please delete "or" replacing the same with the word --and--.

Signed and Sealed this

Twenty-second Day of September, 1992

Attest:

DOUGLAS B. COMER

Attesting Officer

Acting Commissioner of Patents and Trademarks